United States Patent [19]

Sharber

[11] Patent Number: 5,551,377
[45] Date of Patent: *Sep. 3, 1996

[54] APPARATUS AND METHOD FOR ELECTROANESTHETIZING FISH

[75] Inventor: Norman G. Sharber, Flagstaff, Ariz.

[73] Assignee: Coffelt Manufacturing, Inc., Flagstaff, Ariz.

[ * ] Notice: The term of this patent shall not extend beyond the expiration date of Pat. No. 5,341,764.

[21] Appl. No.: 297,700

[22] Filed: Aug. 29, 1994

Related U.S. Application Data

[63] Continuation-in-part of Ser. No. 960,119, Oct. 13, 1992, Pat. No. 5,341,764.

[51] Int. Cl.$^6$ ..................................................... A01K 61/00
[52] U.S. Cl. ............................................................. 119/220
[58] Field of Search ............................................... 119/220

[56] References Cited

U.S. PATENT DOCUMENTS

| 1,292,246 | 1/1919 | Burkey | 119/220 |
|---|---|---|---|
| 1,515,547 | 11/1924 | Burkey | 119/220 |
| 1,974,444 | 9/1934 | Burkey | 175/311 |
| 2,233,045 | 2/1941 | Bonner et al. | |
| 4,750,451 | 6/1988 | Smith | 119/220 |
| 4,825,810 | 5/1989 | Sharber | 119/220 |
| 5,111,379 | 5/1992 | Sharber et al. | 363/128 |
| 5,233,782 | 8/1993 | Sharber et al. | 43/17.1 |
| 5,270,912 | 12/1993 | Sharber et al. | 363/128 |
| 5,311,694 | 5/1994 | Sharber et al. | 43/17.1 |
| 5,327,668 | 7/1994 | Sharber et al. | 43/17.1 |
| 5,341,764 | 8/1994 | Sharber | 119/220 |

Primary Examiner—Robert P. Swiatek
Attorney, Agent, or Firm—Cahill, Sutton & Thomas P.L.C.

[57] ABSTRACT

An electrically insulated water containable member has a first electrode and a pair of second electrodes bracketing the first electrode. A source of electric power is connected across the first electrode and each electrode of the pair of second electrodes to develop an electric field within the member between the first electrode and each electrode of the pair of second electrodes, which electric field causes narcosis or tetany in any fish present in water within the member and between the pair of second electrodes.

25 Claims, 5 Drawing Sheets

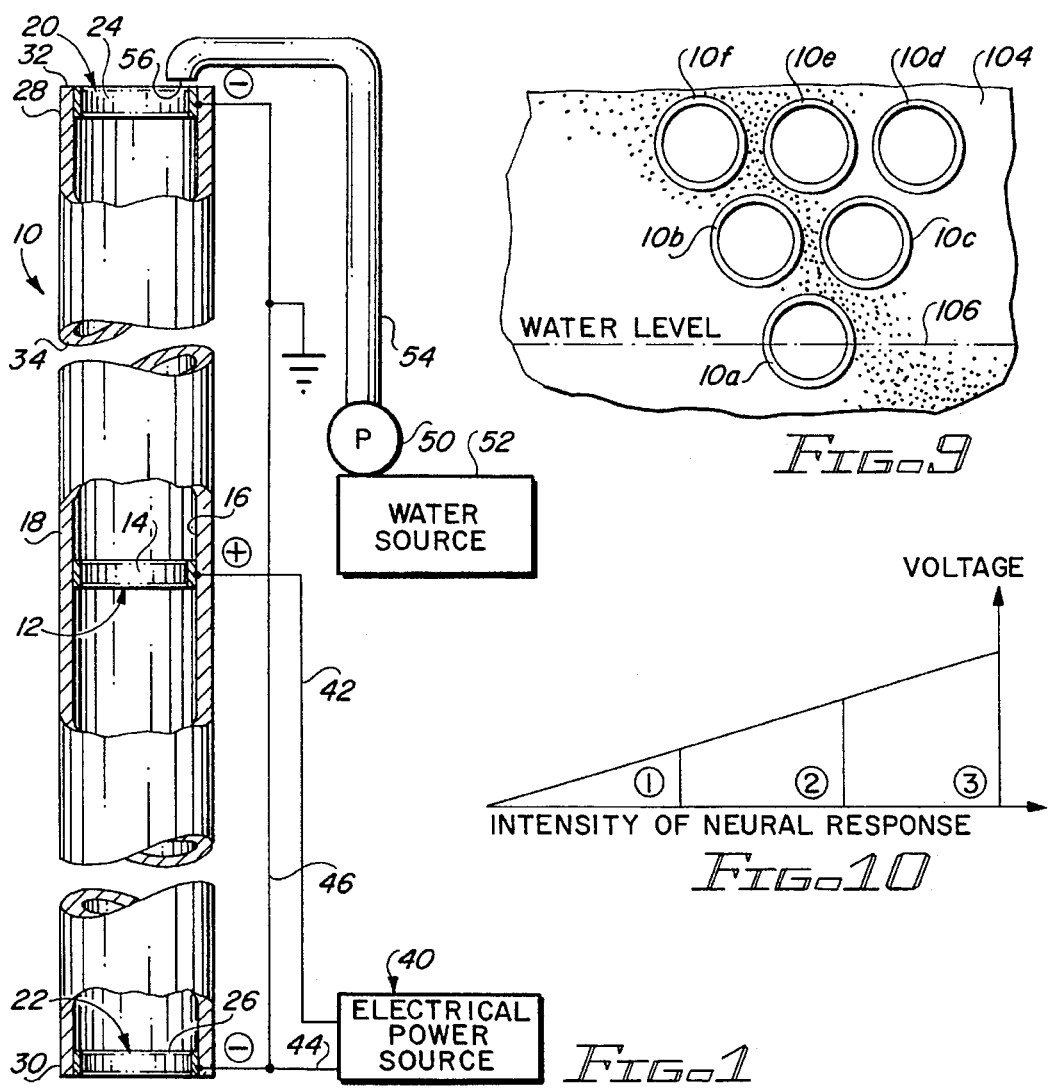
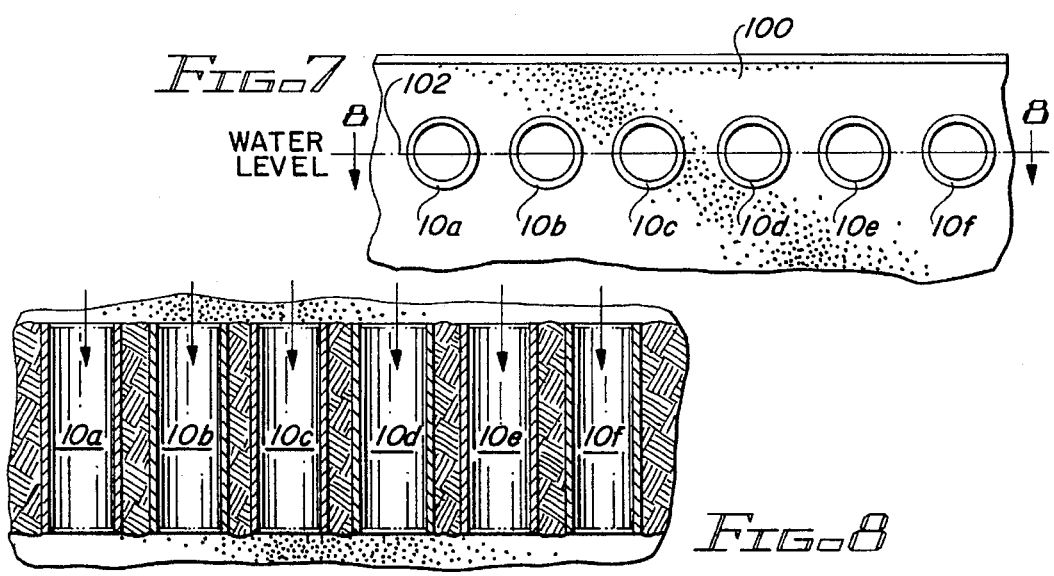

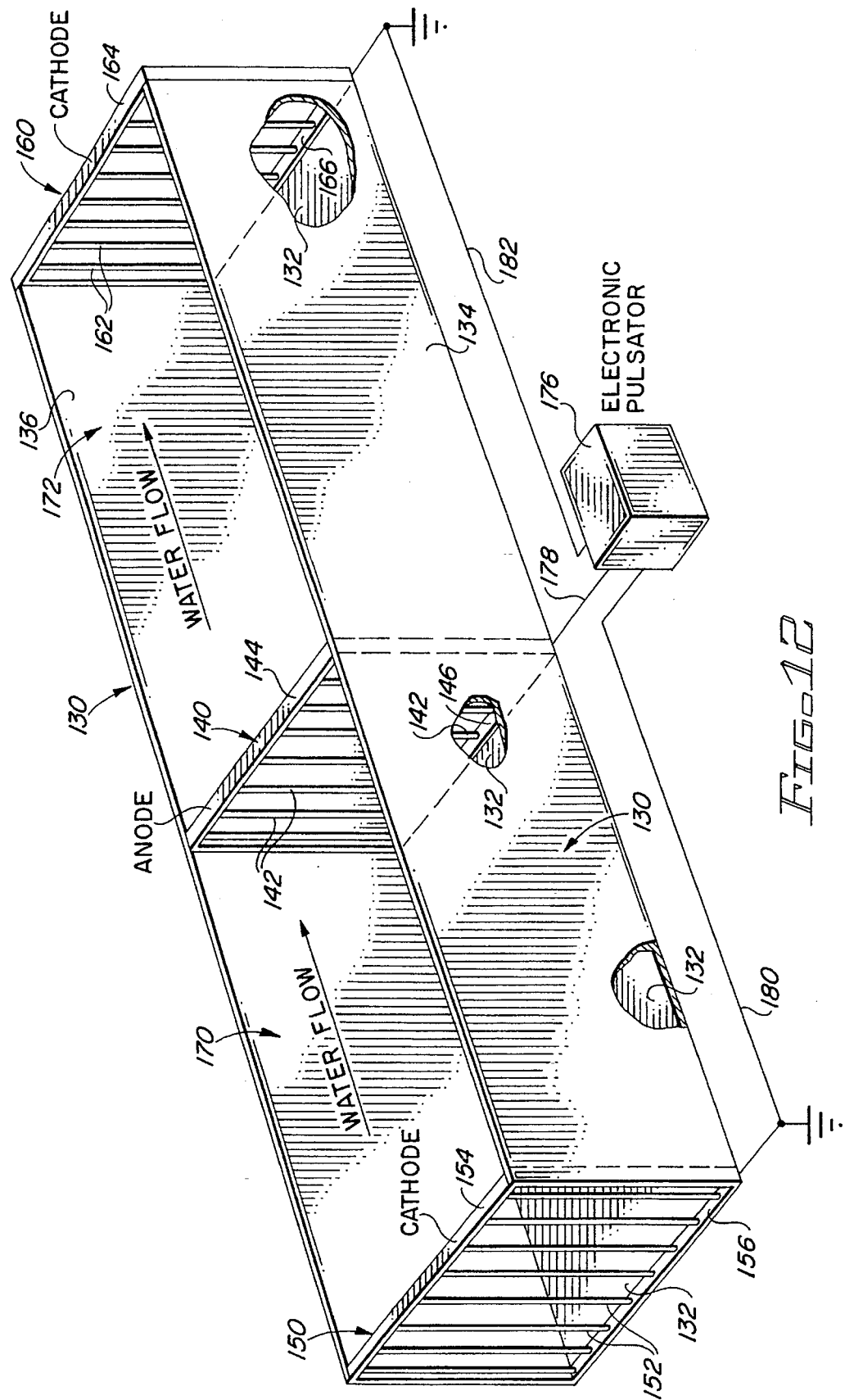

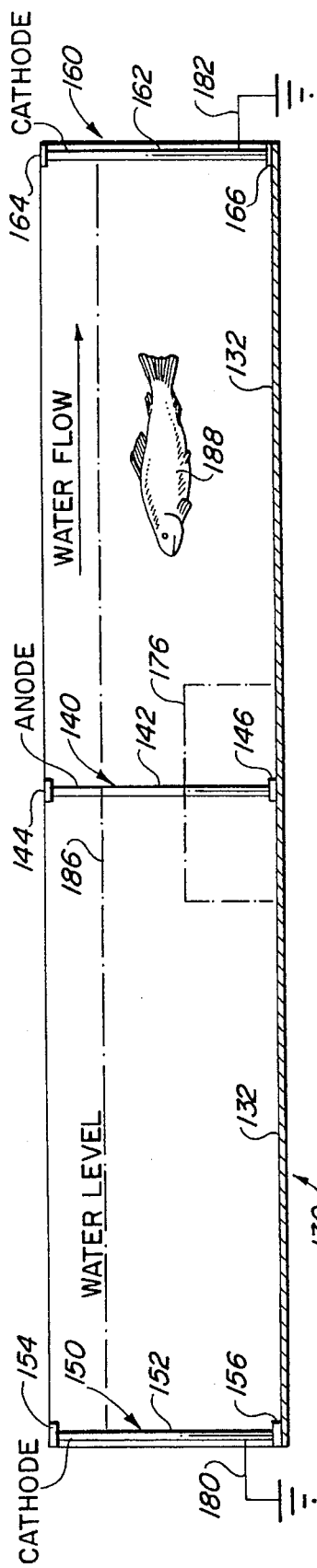
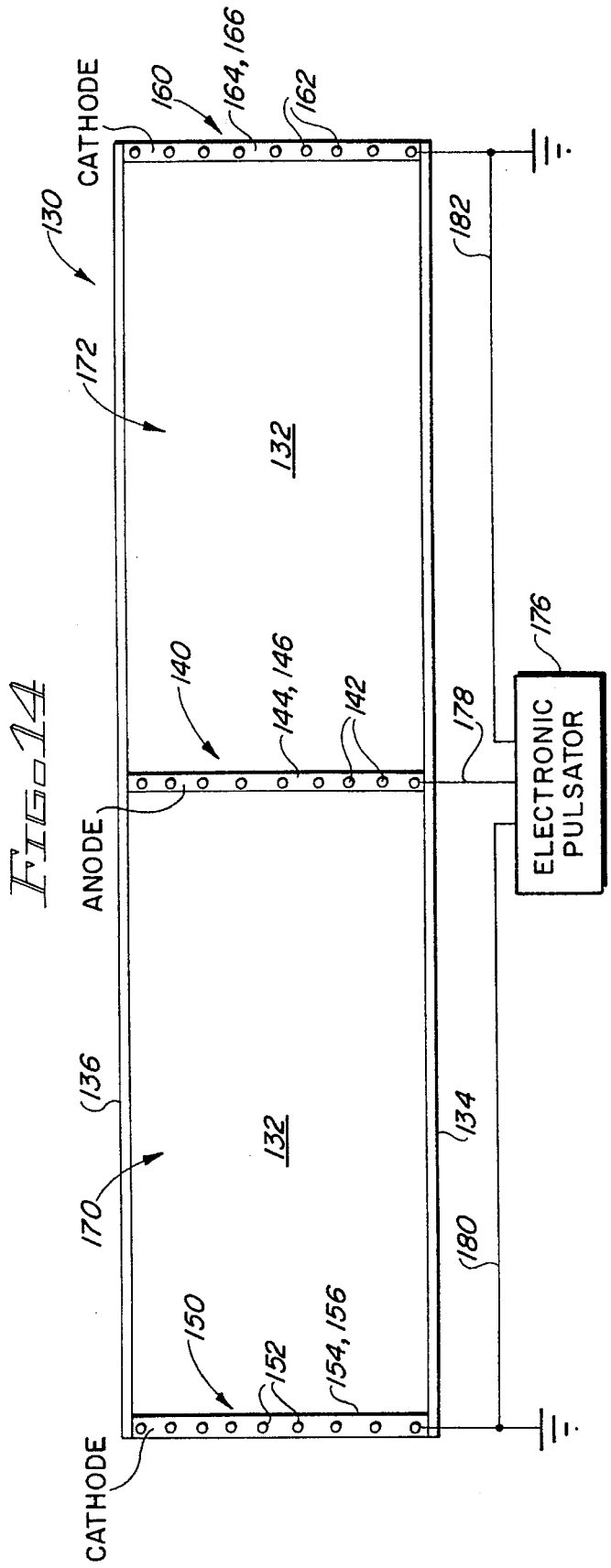

APPARATUS AND METHOD FOR ELECTROANESTHETIZING FISH

CROSS REFERENCE TO RELATED APPLICATIONS

This application is a continuation in part application of a application entitled "Electric Fish Barrier", filed Oct. 13, 1992, assigned Ser. No. 07/960,119, now U.S. Pat. No. 5,341,764, and describing an invention by the present inventor.

BACKGROUND OF THE INVENTION

1. Field of the Invention

The present invention relates to electrofishing and, more particularly, to apparatus and a method for electroanesthetizing fish.

2. Description of Related Art

Electrofishing apparatus, to attract fish to a specific location or to repel fish from a specific location, have been used for decades. Electric barriers to control movement of fish have also been used for decades with greater or lesser degree of success. These barriers fall into two broad groups: those that use alternating current (AC) and those that use direct current (DC). In each of these two broad groups, the electric barriers may incorporate electrodes that lie flat on the bottom of the body of water or they may incorporate various patterns of immersed vertical rods or cables serving as electrode arrays. Various other configurations of electrodes are also known. A plethora of varieties of types of electric power sources exist, including the use of pulsed and constant currents (whether AC or DC), various frequencies or frequency ranges, single phase or three phase current, spacing and separation of electrode elements as a function of the type and nature of electric power applied, etc.

Each of the existing electrofishing apparatus and electric barriers attempts to provide a balanced solution of the various problems set forth below. Alternating current (AC) is used as the source of electric power for the following primary advantages: (1) permits more economy of design; (2) fish are far more sensitive to an AC field than to a DC field; (3) continuous use of DC is limited because of the electrolytic build up of oxides and other chemicals that occur on the cathode electrode resulting in electrically non conducting blankets enveloping the cathode electrode and there occurs erosion of the anode electrode; (4) it is easier to design uniformly distributed fields to eliminate equipotential paths through the electric field. Direct current (DC), whether pulsed or constant, offers primarily only one advantage. Fish swimming in a unipolar electric field of sufficient strength will suffer a type of seizure (galvanotropism) which causes the fish to swim only toward the anode electrode. This means that if the cathode electrode is identified as a "barrier", fish swimming toward the cathode electrode will turn and swim away (galvanotaxis); thus, the cathode electrode presents a type of barrier to fish movement. Sophisticated versions of DC electric fields involve use of a pulsed current, shaping of the pulses, selection of pulse frequencies and control of the width of the pulses. Pulsed DC current is more efficient than constant DC current in (1) causing neurological reactions in the fish; (2) reducing the amount of electrical energy consumed by the barrier; and (3) turning the fish away before they enter the strongest part of the field near the cathode electrode. If the barrier (cathode electrode) is in a slow moving or stagnant water, the galvanotaxis syndrome will cause the fish to move out of the strong electric field before they become narcotized (the next level of seizure that a fish experiences if shocked above the level that produces galvanotropism) and an accumulation of unconscious fish in proximity to the cathode electrode is prevented. In practice however, fish that are not moved out of the strong electric field by the moving water, swimming or electrotaxis, suffocate and die. The accumulation of dead fish quickly translates into a very unpleasant and unhealthy problem.

DC systems that are sufficiently sophisticated to accomplish the desired control of the movement of fish are expensive and subject to failure. Where the system is a fish barrier, it must be on continuously with zero down time or else it is ineffective in serving its primary purpose. Finally, the electrolytic action on the cathode and anode electrodes will ultimately cause down time for replacement unless significant redundancy of electrodes and circuits is employed.

The electrolytic action on the electrodes due to DC current can be avoided and the neurological reactions of the fish to DC current can be preserved if the electric field is formed by an asymmetrical AC current. In such systems, the total amount of energy in the positive and negative portions of each cycle is equal. By appropriate circuit design, it is possible to produce a brief high voltage pulse in the positive half cycle and a much lower peak voltage but longer duration pulse in the negative half cycle, whereby the energy of each half cycle is essentially equal. Such equality of energy in each cycle will effectively neutralize electrolytic build up upon the electrodes. Since the fish will respond neurologically to the peak voltage half cycles, the reactions of galvanotropism and subsequent galvanotaxis will be preserved. Accordingly, such a system is probably ideal for a fish barrier but it is technologically difficult to construct, is expensive and suffers from problems of reliability. Accordingly, it has limited practical applications.

Electrodes are normally set in a vertical array since such an array will produce a uniform distribution of an electric field which field assures that fish travelling at any depth in the adjacent water column will encounter a strong field strength. Such a configuration is unpopular and not very suitable for certain sites, such as rivers, that have moving water carrying debris as the debris may collect at and build up upon the electrodes. The force of the moving water acting on the debris build up may be sufficient to damage or destroy the electrodes. If the electrode spacing is sufficient to allow expected debris to pass, the effective electrical field between the electrodes is severely degenerated. Of course, if debris of any consequence is not present, the benefits of a strong uniform electric field attendant the vertically oriented electrodes can be realized without an expectation of damage to the electrodes. To place electrodes horizontally on the bottom of the body of water or suspended in a water column, or both for deeper waters, the debris problem may be solved but the electric field produced is not uniform from the top to the bottom of the water. Without a uniform field, accurate prediction of fish reaction at any location in the electric field becomes problematical. That is, the fish travelling along the bottom will not be subjected to the same field strength as the fish moving close to the surface or anywhere therebetween. When the electrodes are horizontal, such as only on the bottom of the body of water, the voltage gradient is essentially vertically oriented and equipotential lines within the field are, to a great extent, horizontal. Accordingly, it is possible for a fish moving horizontally to sense no voltage difference between the voltage present at its head and at its tail. Without such a sensed voltage difference, the electric field will have little effect upon the fish. While there is no voltage gradient between the head and tail when the fish is parallel to the equipotential lines, there is a voltage from one side of the body of the fish to the other. This voltage gradient is small when compared to the fish with its entire body length across the field and the amount of current induced in its flesh is proportionately less. Still, in the strongest part of the field, a fish can receive enough of a shock in this position that all of the neurological reactions of galvanotaxis, narcosis, and tetany can occur.

In many parts of the United States and the world, there exist interconnected bodies of water wherein an upstream body of water has been stocked with fish for sport fishing purposes or for fish farming purposes. When fish predatory to the stocked fish exist in a body of water downstream, it is mandatory to prevent movement of the predatory fish into the upstream body of water containing the stocked fish. In most instances, the use of a physical barrier to absolutely prevent such migration of the predatory fish is not a viable solution. Accordingly, a barrier which accommodates flow from the upstream body of water to the downstream body of water must be used. Moreover, such barrier must accommodate the flow of normal debris and detritus. To be effective, as discussed above, the barrier must operate continuously and for a period of years with minimal maintenance and replacement requirements. Finally, the barrier must accommodate very slow moving water and rapidly moving water without change in effectiveness.

Tagging, collecting, separating and/or imprinting fish without injury to the fish or harvesting the fish for purposes of collecting the eggs, segregating the edible meat or gathering other parts of the fish for various purposes may require calming of the fish without killing the fish. Three methods for handling the fish to achieve either of these ends have been used. First, the fish can be stunned or have their necks broken. This requires manual labor to handle each fish and is a formidable and expensive task when thousands of fish per day have to be processed. Second, the fish can be subjected to chemicals to calm or kill them. Such use of chemicals is generally unlawful because of the resulting possible pollution of waterways and health hazards attendant ingestion of any part of the fish. Third, the fish can be electroanesthetized for a short period or in weak electric fields to calm them without causing injury or death due to suffocation. Or the fish can be killed through suffocation resulting from sufficient exposure time or high density electric fields. A major problem attendant existing apparatus for electroanesthetizing fish is the danger of electric shock, injury and death to attending workers or bystanders.

SUMMARY OF THE INVENTION

One or more waterways, such as culverts, interconnecting an upstream body of water with a downstream body of water accommodate the natural flow of the water and the passage of fish therethrough. To prevent movement of live healthy fish, each of these culverts includes an electrode located internally and generally central to the culvert and an electrode of a pair of electrically interconnected grounded electrodes located internally and at each end of the culvert. A source of alternating current is electrically connected across the center electrode and the pair of end electrodes to establish an alternating electrical field within the water flowing through the culvert. The use of alternating current will prevent electrolytic build up upon the electrodes. As the electric field is contained solely between the pair of grounded electrodes, the voltage and commensurate field strength may be significant. Because the field strength gradient will be along the longitudinal axis of the culvert, any fish entering the culvert will experience a significant potential difference between its head and tail sufficient to at least stun the fish before it has an opportunity to swim upstream through the culvert. The water flow through the culvert will wash stunned fish out of the culvert and into the downstream body of water. Such electrodes and attendant circuitry can also be used to deliberately electroanesthetize fish placed within such a passageway, or other container or box having the central and end electrodes while limiting the electrical field present to only the space between the opposed grounded electrodes bracketing the central electrode and thereby eliminate any health hazard to personnel due to electrical shock.

It is therefore a primary object of the present invention to provide an electric field defined by three electrodes for electroanesthetizing fish.

Another object of the present invention is provide an electric field within a defined environment and between an ungrounded electrode and two bracketing grounded electrodes for electroanesthetizing fish.

Yet another object of the present invention is to provide an electric field within and between fixed parameters in a body of flowing or non flowing water to electroanesthetize fish.

Still another object of the present invention is to provide electrodes disposed within fixed boundaries to establish an electric field electrically contained within the boundaries.

A further object of the present invention is to provide a first electrode, a pair of grounded second electrodes bracketing the first electrode and a source of alternating current electrically connected to the first and second electrodes to create an electric field between the first electrode and each electrode of the pair of second electrodes to electroanesthetize any fish present between the pair of second electrodes.

A yet further object of the present invention is to provide a three electrode apparatus to create an electrically contained field for electroanesthetizing fish.

A still further object of the present invention is to provide a low maintenance, low cost electric field for electroanesthetizing fish.

A still further object of the present invention is to provide an electric field for electroanesthetizing fish that does not subject operating personnel to the hazards of an electrical shock.

A still further object of the present invention is to provide a method for electroanesthetizing fish within a dimensionally defined electric field.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 is a partial cut away view illustrating the structure of an electric fish barrier;

FIG. 7 is a elevational view illustrating a plurality of culverts interconnecting an upstream body of water with a downstream body of water;

FIG. 8 is a top view taken along lines 8—8, as shown in FIG. 7;

FIGS. 9 illustrates an arrangement of a plurality of culverts interconnecting a downstream body of water with an upstream body of water to accommodate various water levels and flow rates from the upstream body of water;

FIG. 10 is a graph illustrating the neural response of fish to sensed voltage;

FIG. 12 illustrates an isometric view of a representative structure for defining a member to completely contain an electric field for electroanesthetizing fish;

FIG. 13 illustrates a side view of the structure shown in FIG. 12; and

FIG. 14 illustrates a top view of the structure shown in FIG. 12.

DESCRIPTION OF THE PREFERRED EMBODIMENT

Figure 2:
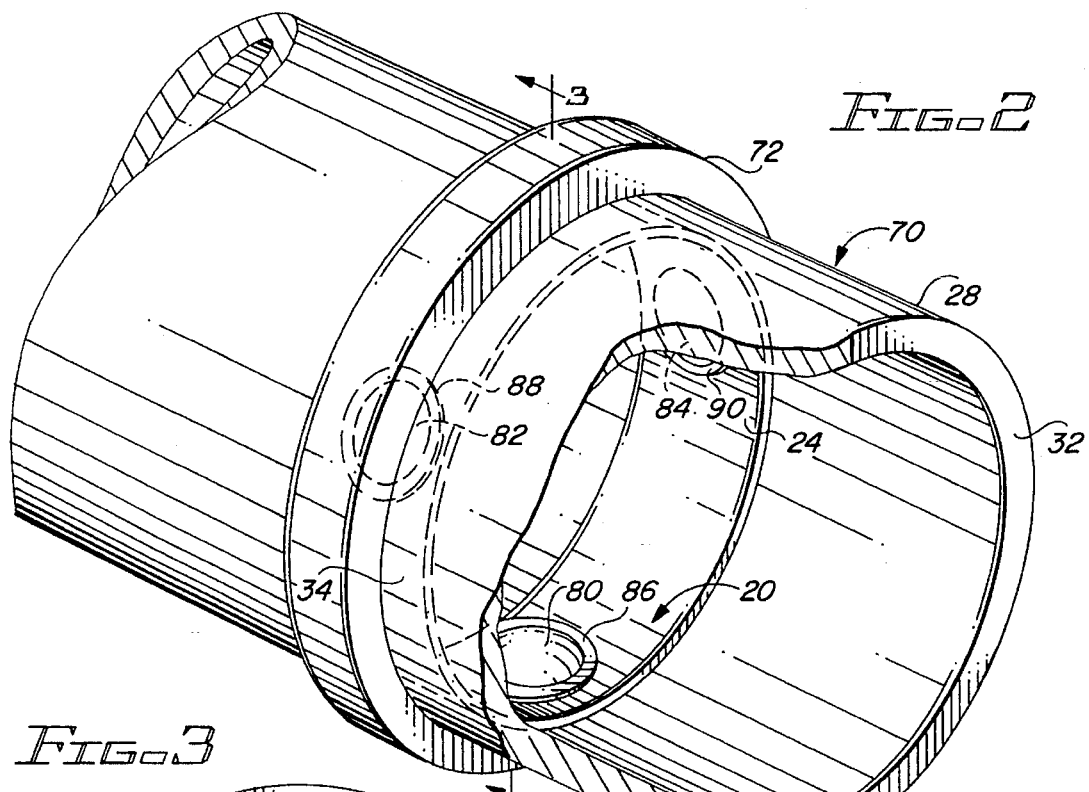
FIG. 2 is a perspective view of an electrode disposed within a water conveying culvert.
Figure 3:
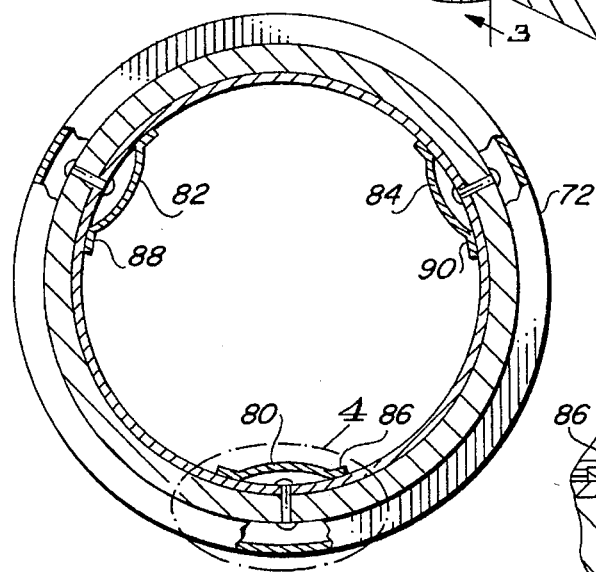
FIG. 3 is a cross-sectional view taken along lines 3—3, as shown in FIG. 2.
Figure 4:
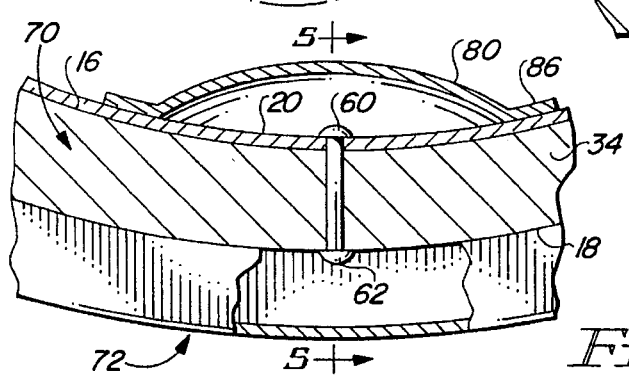
FIG. 4 is a detail view taken within dashed circle 4 shown in FIG. 3.
Figure 5:
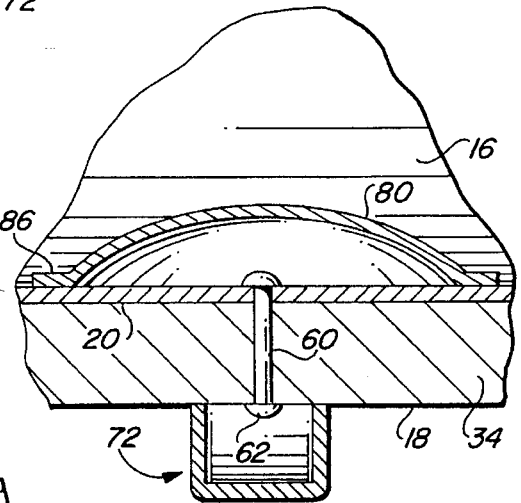
FIG. 5 is a cross-sectional view taken along lines 5—5 as shown in FIG. 4.

The primary goal of the present invention is to provide a three electrode apparatus and power source for creating an electric filed having fixed boundaries to electroanesthetize fish disposed within the electric field. A second significant goal is to provide an electric field serving as a fish barrier, which electric field is configured to preclude the possibility of a fish passing through the electric field without suffering ultimately fatal injuries. Further goals include: 1) use of conventional electric power lines to supply electric power through a transformer to circuitry for establishing an electric field serving as a fish barrier; 2) accommodate flow of normal expected debris through an electric field serving as a fish barrier; 3) low maintenance costs; 4) a long operating life measured in terms of years; and 5) nominal operating costs relative to the benefits achieved.

Referring to FIG. 1, there is illustrated a conventional commercially available drainage pipe of plastic material, such as polyethylene. Hereinafter, the pipe will be referred to as a culvert since such term is more descriptive of the water conveying function performed. Culvert 10 is available in various diameters and lengths. For purposes of the present invention, a pipe or culvert having a 36 inch diameter and a 20 foot length represents a preferred size and length to accommodate flow therethrough of normally expected suspended or floating debris and such length is sufficient to establish an electric field which is 100% effective as a fish barrier. Culverts of this type and size are readily available from many sources. It is to be understood that culvert 10 of other diameters or lengths may perform equally well or even better, depending upon the water purity, flow rate, electric power applied, configuration of electrodes, etc.

Culvert 10 includes a central electrode 12, which electrode may be a band 14 extending about inner cylindrical surface 16 of the culvert. Typically, the band may be 12 inches wide if culvert 10 is approximately 3 feet in diameter and 20 feet long. A pair of electrodes 20, 22 may also be bands 24, 26 located adjacent cylindrical surface 16 close to opposed ends 28, 30 of culvert 10. Bands 24, 26 may also be 12 inches wide.

A source of electric power 40, which may be a source of alternating current, is electrically connected to electrode 12 through electrical conductor 42. The electrical power source is also electrically connected to each of electrodes 20, 22 through electrical conductors 44 and 46. As indicated, electrical conductors 44 and 46 are grounded which places electrodes 20, 22 at ground potential. At remote locations electrical power source 40 may constitute a generator. However, since conventional electric overhead power lines are relatively readily available at or close to locations where the fish barrier is likely to be used, such power line may serve as the source of electrical power. Depending upon the voltage to be applied to electrodes 12, 20 and 22, a voltage step down transformer may be incorporated. In a preferred embodiment, the alternating current will be a conventional sinusoidal current.

If culvert 10 is installed between bodies of water having a low flow rate therebetween, it may be prudent to periodically wash the culvert to wash away silt, debris and any accumulated dead fish or other decomposing protoplasm. For this purpose, a pump 50 is connected to a water source 52, which water source may be the body of water upstream of culvert 10. Outflow from pump 50 is conveyed through conduit 54 and discharged through inlet 56 into the upstream end of culvert 10. This additional water introduced to the upstream end of culvert 10 will have a washing action to discharge silt, debris and rotting protoplasm from within culvert 10. Downstream of the culvert, the rotting protoplasm decomposes in the conventional manner.

In operation, upon applying electric power from electric power source 40 to electrodes 12, 20 and 22, an electric field will be established in the water within culvert 10. Because of the configuration of the electrodes, the electric field may be somewhat distorted in proximity to the electrodes but at a short distance therefrom, the voltage gradient between the end electrodes and the center electrode will be relatively conventional and constant. Any fish voluntarily entering culvert 10 at the downstream end, such as end 30, would experience a neuromuscular reaction as soon as it passes over electrode 22. Such reaction will tend to cause the fish to scatter away from end 30 of culvert 10. Any fish that remains within the culvert will become narcotized (immobilized) relatively quickly as a result of the neural response to the sensed voltage (potential) difference between the head and tail of the fish. The gradient of the electric field between electrode 12 and electrode 22 extends along the longitudinal axis of culvert 10. Any fish swimming through the culvert will be generally aligned with the longitudinal axis of the culvert and will therefore experience the greatest voltage difference between its head and tail. Thus, the orientation of the fish will place it in a position of maximum exposure to the electric field. It is therefore unlikely that any fish swimming into culvert 10 will not experience the maximum possible voltage difference between its head and tail.

When a fish becomes immobilized upon entry into culvert 10, the water flow through the culvert will tend to wash it out through downstream end 30. If the flow rate is insufficient to expunge an immobile fish, the fish will become asphyxiated and die. To prevent an accumulation of dead fish and rotting protoplasm within culvert 10, pump 50 may be periodically actuated to pump water through the culvert and wash out the dead fish and rotting protoplasm.

In the event a fish manages to swim upstream through culvert 10 and exit into the upstream body of water through end 28, such fish will have been severely injured. Innumerable tests conducted on fish exposed to electric fields of various voltages indicate that an electric field developed by applying alternating current between two immersed electrodes will cause muscular injuries within the fish of sufficient gravity to bring about death relatively soon. Moreover, the reproductive organs of the fish will have been sufficiently injured to prevent propagation. Thus, even if a predatory fish sought to be contained within the downstream body of water were to enter the upstream body of water, it would have a very short subsequent life and be capable of few, if any, predatory activities. The threat of reproduction by a predatory fish exiting through upstream end 28 of culvert 10 is non existent.

Referring jointly to FIGS. 2 to 6, further details attendant electrodes 12, 20 and 22 will be described along with a variant thereof. Moreover, a variant configuration of the pipe forming culvert 10 will be discussed. Electrode 20, also representative of electrodes 12 and 22, may be disposed at edge 32 of end 28, as illustrated in FIG. 1, or somewhat inwardly therefrom, as illustrated in FIG. 2. Electrode 20 (and electrodes 12 and 22) may be a simple band 24 of approximately 12 inches in width when used with a culvert 10 having a 36 inch diameter. Different size culverts may permit use of different width electrodes without loss of function or operating capability. Band 20 may be secured adjacent surface 16 of culvert 10 by attaching means, such as rivets 60 penetrably engaging both band 16 and wall 34 of the culvert. In the event wall 34 is of sufficient thickness or of material sufficient to permit use of screws, screws may be used; alternatively, conventional nut and bolt means may be used instead of rivets. If attaching means 60 is metallic or electrically conducting, it is preferable from a safety standpoint to shield the attaching means exposed exterior of wall 34 with an insulating medium. That is, any protrusion 62 of the attaching means extending from exterior surface 18 of the culvert should be shielded by an insulating medium. Such shielding may be accomplished by a simple patch, covering, or the like. Alternatively, a pipe 70 having a plurality of hollow annular rings 72 spaced longitudinally therealong may be employed. By selectively locating the attaching means, rings 72 serve in the manner of an insulating shield to shield any protrusions 62 of the attaching means which may be present at or extend beyond surface 18 of pipe 70. Such rings also provide additional structural rigidity to pipe 70 to contribute to its strength in resisting deformation resulting from settling of the ground wherein it may be placed and against deformation from other possible influences. Pipes of the type depicted by pipe 70 are commercially available.

The electrodes, formed by the respective annular bands, will create an electric field having somewhat convoluted equipotential lines in proximity to each respective electrode. These equipotential lines of field strength tend to become more uniform two or more feet away from the electrode. To enhance uniformity of the equipotential lines in the electric field, domes, such as domes 80, 82 and 84 may be attached to or formed as part of each of the bands. Preferably, the domes are equidistant from one another with one of the domes being placed at the bottom of the band and the two remaining domes being placed in opposed directions therefrom. These domes will provide a radiation pattern which substantially improves the uniformity of the electric field attendant each electrode 12, 20 and 22. As depicted, domes 80, 82 and 84 may include respective annular skirts 86, 88 and 90 for attachment to the underlying band, such as band 24. The method of attachment may be by welding, riveting or other attaching means. Preferably, each dome defines a segment of a spherical surface but a curved non spherical surface may also be employed. The degree or extent of spherical surface may vary and may include a hemispheric surface.

Even in AC systems, the electrodes may deteriorate or be degraded due to chemical corrosion as a function of the chemical make-up of the water (dissolved solids), microorganisms that may attack the electrodes and the voltage and amperage applied to the electrodes. To accommodate such deterioration over time it is preferable that the electrodes be detachably mounted to permit replacement. For example, the electrodes could be bolted in place to accommodate removal and replacement. Alternatively, the electrodes could be mounted upon a removable insulated frame attached to the waterway of culvert. By using a large diameter pipe, a workman can crawl into the pipe to replace any or all three of the electrodes with relative ease, whether the replacement be on individual electrode or a frame supporting the electrode.

Figure 6:
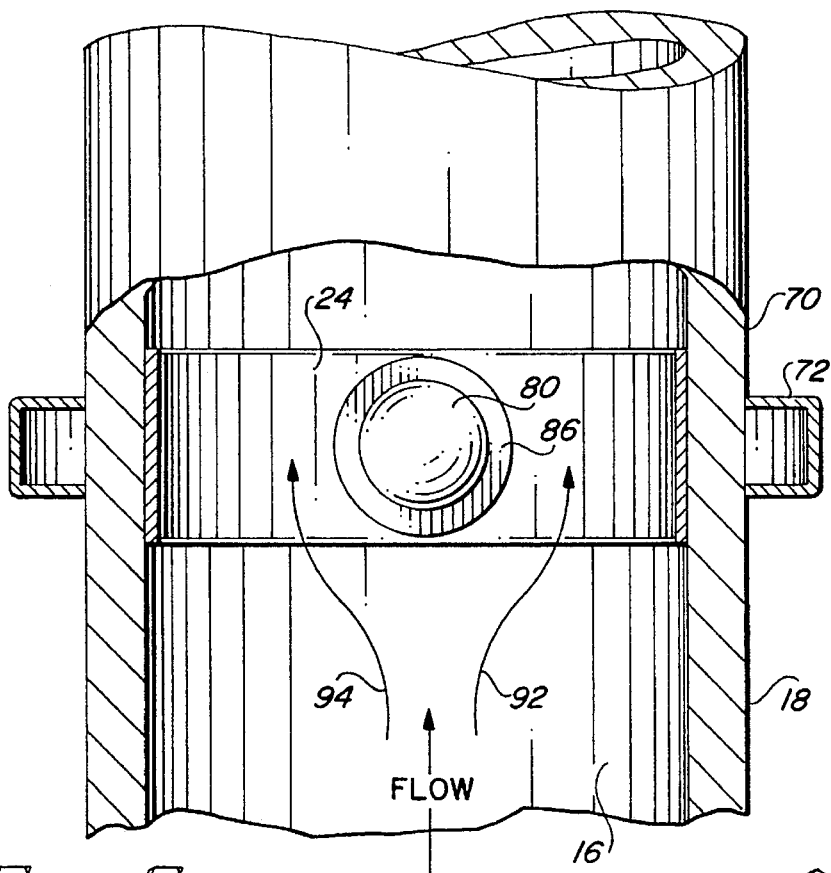
FIG. 6 Is a cut away top view of a segment of an electrode disposed within a culvert.

Any covering of any of electrodes 12, 20 or 22 will degrade the radiation pattern. Such covering may include the deposition of silt or debris conveyed into the culvert by the flow of water. As depicted in FIG. 6, the presence of dome 80 will encourage a more rapid water flow around and about the dome, as depicted by arrows 92, 94. The resulting flow, more rapid than ambient flow, will have a scrubbing effect to reduce the deposition of silt and debris on the dome and on band 24 adjacent the dome. Upon introduction of an additional washing flow of water produced by pump 50 (see FIG. 1) additional impetus will exist to wash silt and debris off electrodes 12, 20 and 22.

As is evident from the above description of culvert 10, the culvert and its electrodes is a totally self contained integral unit and it is a modular unit. In marshy areas where two bodies of water are interconnected with one another by flow across an area of substantial width, a single culvert 10 may not be sufficient to accommodate the widespread natural flow of water. At such location, a plurality of culverts 10 may be placed parallel to and in proximity with one another, as depicted in FIGS. 7 and 8. Culverts 10a, 10b, 10c, 10d, 10e and 10f are retained within a berm 100 at an elevation approximately coincident with water level 102. The resulting wide flow path will essentially not disturb the natural water flow path between the two bodies of water. For various ecological purposes, the resulting minimal water flow disturbance is preferred and of significant import.

As is evident upon review of FIG. 7, and accompanying cross section, FIG. 8, no matter what the water level, provided it is at least high enough to permit entry of water into one or more of culverts 10a to 10f, electrodes 12, 20 and 22 within each respective culvert are immersed and an electric field within the water in each culvert will be established. Such electric field, for reasons set forth above, will serve in the manner of an absolute barrier to prevent migration of any fish from the downstream body of water into the upstream body of water without injury to the fish. If the natural flow rate between the two bodies of water is relatively low, each culvert may include a pump 50 and conduit 54, as described with respect to FIG. 1, to periodically wash the respective culvert to expel debris, rotting protoplasm, etc.

When the water level in an upstream body of water, in fluid communication with a downstream body of water, changes significantly, due to normal snow melt, ice melt or significant rain storms, a configuration of culverts depicted in FIG. 9 may be employed. Herein, culverts 10a, 10b, 10c, 10d, 10e and 10f are stacked in an inverted pyramidal configuration within a berm 104. Such inverse stacking of the culverts accommodates the normally expected higher flow rate when water level 106 is higher than normal and yet a flow rate at the lowest water level is accommodated. It is apparent that if one of culverts 10a to 10f is above water line 106, there is no point in energizing the respective electrodes contained therein. A simple conventional water sensing element may be used to perform a switching function to de-energize the electrodes in such culvert. Because of the unitary or modular configuration of culvert 10, any number of culverts may be mounted in any configuration commensurate with the water flow requirements between two bodies of water no matter how such water flow may vary throughout the year.

As alluded to above, the length of culvert 10 may be more or less than 20 feet and the diameter may be more or less than 36 inches, depending upon considerations attendant the location of use. While a culvert of 36 inch diameter will accommodate most suspended debris and much floating debris, it may be prudent to incorporate a floating barrier or other barrier upstream of the culvert(s) to inhibit floating or suspended debris from clogging the entrance to one or more of the culverts. Screens or barriers of this type are well known and the selection of an appropriate type is within the purview of one skilled in the art.

Referring to FIG. 10, there is illustrated in graph form the relationship of intensity of neurological response of fish to the level of voltage sensed between the head and the tail of the fish. In zone 1, movement of the fish will be induced, which movement is known as galvanotaxis. Such neurological response is sought where the movement of fish is to be directed along a predetermined path or into a specific area. In zone 2, the fish suffer narcosis or may be considered to be anesthetized. This is the degree of intensity to be induced when fish are to be calmed and netted without causing permanent injury to the fish. In zone 3, tetany occurs. Tetany is more likely to lead to injury and death than is narcosis because the associated sustained loss of breathing and the increased likelihood of torn tissues and severe vertebral damage. If a fish is removed from the electric field (zone 3) soon enough, it may live but is likely to be severely injured. With regard to culvert 10, it is a 100% effective fish barrier if any fish entering therein suffer narcosis because the fish will then cease swimming and either be washed downstream or become asphyxiated if they remain within the culvert. Should the electric field within the culvert be sufficient to cause tetany in some of the fish, such fish will probably die and ultimately be washed downstream.

Upon inspection, it will be evident that the electric field within culvert 10 is totally contained within the culvert. Accordingly, the electric field presents no safety hazard to persons or animals outside of the culvert. Furthermore, the end electrodes (20, 22) are at ground potential and may be contacted without fear of electrical shock. Accordingly, culvert 10 satisfies all reasonable and normal expectations of safety of use and will not endanger persons or animals in proximity to the culvert.

Figure 11:
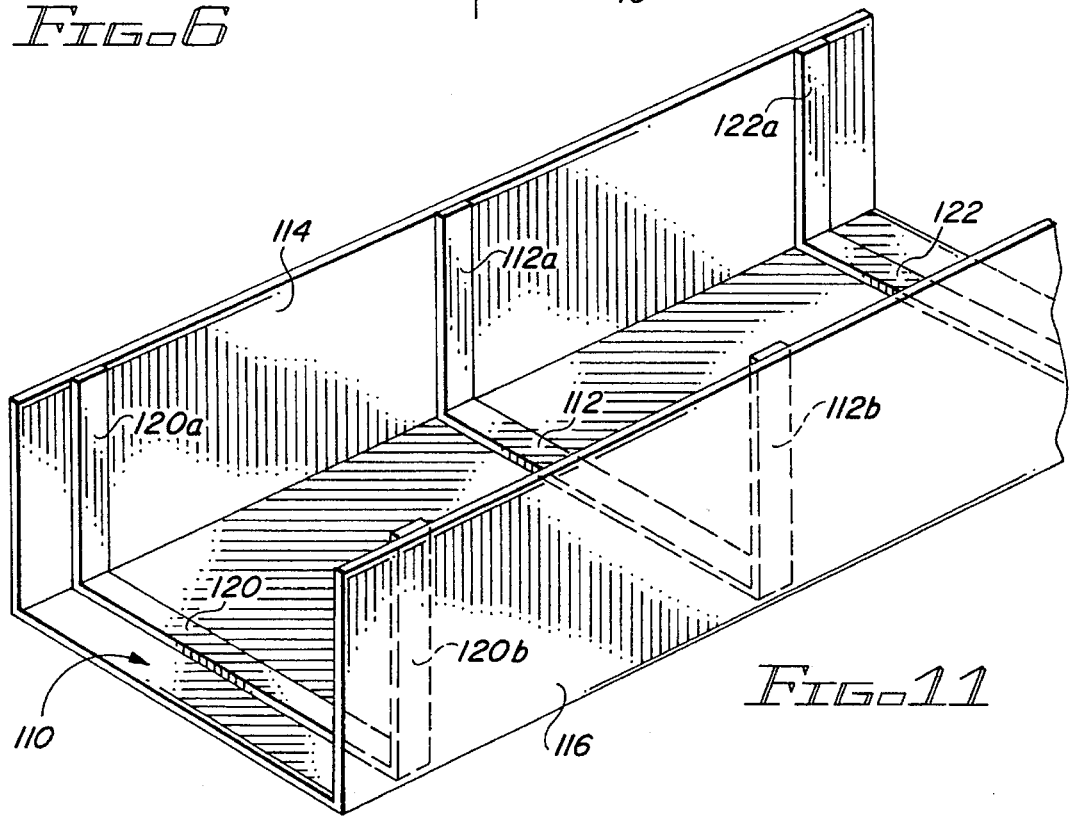
FIG. 11 illustrates an open channel having a first electrode extending thereacross and a pair of second grounded electrodes disposed on opposed sides of the first electrode.

Referring to FIG. 11, there is illustrated a further waterway represented by open channel 110 for accommodating water flow between two bodies of water. A first electrode 112 may be disposed across the channel at the bottom of the channel. Under certain circumstances, extensions 112a and 112b may extend part way or fully along sides 114, 116 of the channel. A pair of second electrodes 120, 122 are disposed along channel 110 on opposed sides of electrode 112. Electrode 120 may include extensions 120a and 120b extending part way or fully along sides 114, 116 of channel 110. Similarly, extensions 122a and 122b of electrode 122 may extend part way or fully along sides 114, 116 of channel 110. Preferably, electrodes 120 and 122 are grounded. Thereby, an electric field will be contained within the water flowing through channel 110 and solely between second electrodes 120, 122. By incorporating side extensions of at least the pair of second electrodes, containment of the electric field therebetween is more assured. For safety or other considerations, extensions 112a and 112b of first electrode 112 may be omitted.

The electric field created within channel 110 is analogous, if not identical, with the electric field created within culvert 10. Furthermore, electrodes 112, 120 and 122 may include domes of the type described above to enhance the gradient of the electric field produced. To accommodate chemical deterioration, electrodes 112, 120 and 122 may be removable for replacement purposes, as discussed above.

From the above description of the configuration depicted in FIG. 11, it becomes evident that electrodes 112, 120 and 122 may be installed in existing channels, canals, other water ways or any member containing water into which fish may be introduced. The power source is an AC power source like that described above with regard to culvert 10. Depending upon local conditions, the configuration of electrodes 112, 120 and 122 may be modified from that illustrated in FIG. 11. Even with such modified electrodes the electric field will be contained solely between the pair of second electrodes disposed on opposed sides of the first electrode.

The configuration illustrated in FIG. 11 eliminates stray currents which exist in all presently known open channel electric barriers. The only manner known for containing such stray currents is through use of extensive insulating mediums, such as sheets of plastic material. The problem is further exacerbated in known systems wherein metallic piping, beams or rebars are present in the ground proximate the channel containing an electric field.

The embodiments of the three electrode apparatus for creating an electrically dimensionally limited electric field can be used as described as not only a barrier but as apparatus for electroanesthetizing fish to the depth represented by zone 2 or zone 3 shown in FIG. 10 and described in detail above. Furthermore, the embodiment of the invention depicted in FIG. 11 provides access from up above to drop or place fish thereinto for the express purpose of electroanesthetizing same to a pre-determined degree. As depicted in FIG. 10, the extent of neural response by the fish is a function of the type of fish, length of fish, and weight of fish in conjunction with the voltage applied to create the field. It is apparent that simple barriers could be placed across the ends of channel 110 to prevent inadvertent or deliberate escape of the fish from within the channel. Alternatively, only a downstream end could be screened or barred to accommodate an inflow and retention of fish and an outflow of only water. Such a device is particularly useful in fish hatcheries or fish processing plants where fish eggs are to be removed or where the fish are to be processed for various purposes. Mechanical means, such as a brail, can be developed to remove electroanesthetized fish from channel 110 to a working surface or area. Alternatively, the fish can be removed by hand after the electric field has been turned off. Because the electric field is electrically limited to the space between the grounded electrodes on opposed sides of the central electrode, and the insulating walls and bottom, the electric field cannot extend through interconnecting waterways and create a hazard for personnel working around and about channel 110.

An alternative form of apparatus for electroanesthetizing fish for purposes of tagging, segregating, inspecting and shocking fish to a state of narcosis (zone 2) or tetany (zone 3), is shown in FIGS. 12, 13 and 14. Furthermore, such apparatus may be used for the purpose of calming fish to permit removal of eggs and without injuring such eggs to any appreciable extent. For certain other processing of the fish a state of tetany can be induced to bring about death through suffocation or otherwise. The apparatus includes a member that may be a container or a box 130 preferably having a bottom 132 and sides 134, 136 of non-electrically conductive material, such as plastic sheet or the like. A central electrode 140 of the three electrode system extends essentially across box 30 between sides 134 and 136. As illustrated, electrode 140 may be formed of a plurality of vertical rods 142 interconnected at least along either the top ends or the bottom ends. Preferably, an electrically conducting bar 144 extends across the top ends and a further electrically conducting bar 146 extends across the bottom ends. Electrode 150 disposed at one end of box 130 includes similar rods 152 that may be interconnected at the top and bottom ends by bars 154, 156. The third electrode 160, in combination with electrode 150, bracket electrode 140. Electrode 160 may also include similar rods 162 wherein the top and bottom ends may be interconnected by bars 164, 166.

As described above, the use of vertical rods provides an essentially uniform density electrical field between central electrode 140 and each of bracketing electrodes 150, 160. Thereby, exposure of any fish within either compartment 170 between electrode 140 and 150 or within compartment 172 between electrode 140 and 160 will be subjected to a relatively uniform electrical field, no matter their depth or their position within the respective compartment. A source 176 of electric power may be a source of electrical alternating current, as described above. Alternatively, it may be a source of electrical pulses, as disclosed in U.S. Pat. Nos. 5,111,379, 5,233,782, 5,270,912, 5,311,694, and 5,327,668, which patents are assigned to the present assignee.

The electrical signals are applied to electrode 140, which may be an anode electrode, through conductor 178. Electrode 150, which may be a cathode electrode, is grounded and connected to source 176 through conductor 180. Similarly, electrode 160, which may be a cathode electrode, is grounded and connected to source 176 through conductor 182. Through the grounding of electrodes 150 and 160, the electric field induced in water 186 disposed within box 130 due to the voltage difference between electrode 140 and each of electrodes 150, 160 is limited to the water present between grounded electrodes 150, 160. Thus, there will be no electrical field in any conduit, channel or other waterway conveying water either into or out of box 130. This electrically limited dimension of the electric field is of significant importance to eliminate the presence of any electrical hazard outside the confines of box 30. It is possible to use box 30 in wet environments, such as in hatcheries and fish processing plants, without creating the potential of an electrical shock for any workmen in proximity to the box.

The removal of any electroanesthetized fish from within box 130 may be performed by mechanical means, such as mechanism for using a brail to lift out the fish. Alternatively, the fish may be removed by hand after source 176 of electrical power is turned off or disconnected from at least electrode 140.

In summary, the apparatus represented by box 130 and its constituent elements defines a three electrode apparatus for electroanesthetizing any fish 188 that may be present within either of compartments 170 or 172. This apparatus electrically contains within defined limits the electric field produced to minimize the presence of any electrical hazard to personnel performing their functions relating to the electroanesthetizing of the fish. Finally, the apparatus can be built and installed as a module that is sized to conform with any existing waterways, channels or troughs used in hatcheries or fish processing plants. As alluded to above, the upstream end of box 130 can be pivotable or removable to permit inflow of fish from a holding tank and thereafter set in place during the electroanesthetizing procedure. Alternatively, the spacing or configuration of the electrode elements can be sized to permit inflow of fish through the upstream electrode and the center electrode while preventing outflow of fish through the downstream electrode. In other configurations, apparatus can be employed to repetitively fill the box with water and fish and drain the water subsequent to the electroanesthetizing procedure to permit easy removal of the anesthetized fish. Finally, a variant structure of box 130 retaining the three electrode configuration and attached power source could be used to transport fish from a holding tank to a depository of some sort while performing the electroanesthetizing procedure prior to, during or subsequent to such transport.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. A three electrode apparatus for establishing an electric field within a body of water to electroanesthetize aquatic animals disposed within the water, said apparatus comprising in combination:
   a) space defined by at least a bottom member and opposed side wall members of primarily non electrically conductive material for housing the water and the aquatic animals;
   b) a source of electric power for the electric field;
   c) a first electrode disposed within said space and electrically connected to said source;
   d) a pair of second electrodes disposed within said space and bracketing said first electrode and electrically connected to said source for establishing the electric field within said space between said first electrode and one electrode of said pair of second electrodes and between said first electrode and the other electrode of said pair of second electrodes; and
   (e) a grounded return path interconnecting said pair of second electrodes and said source to limit the electric field in the water within said space to a volume defined by the side wall and bottom members defining said space and said pair of second electrodes.

2. The apparatus as set forth in claim 1 wherein said space is defined by a container.

3. The apparatus as set forth in claim 2 wherein said first electrode comprises a plurality of rods disposed across said member.

4. The apparatus as set forth in claim 3 wherein each electrode of said pair of second electrodes comprises a plurality of rods disposed across said container.

5. The apparatus as set forth in claim 4 including an ingress and an egress for accommodating water flow through said container.

6. The apparatus as set forth in claim 1 wherein said first electrode comprises a plurality of rods disposed across said space.

7. The apparatus as set forth in claim 6 wherein each electrode of said pair of second electrodes comprises a plurality of rods disposed across said space.

8. The apparatus as set forth in claim 7 including an ingress and an egress for accommodating water flow through said space.

9. The apparatus as set forth in claim 8 including a power level adjustment for setting the intensity of the electric field.

10. A method for establishing an electric field of limited dimensions in water within an apparatus to electroanesthetize aquatic animals disposed within the limited dimensions, said method comprising the steps of:
   a) applying power from a source of electric power to a first electrode disposed within the water in the apparatus;
   b) providing an electrical return path to the source of electric power from each electrode of a pair of electrodes disposed in the water in the apparatus and bracketing the first electrode; and
   c) grounding the return path to limit a dimension of the electric field in the water commensurate with the distance between the pair of electrodes.

11. The method as set forth in claim 10 including the step of limiting expansion of the electric field past the surfaces of the apparatus in contact with the water.

12. The method as set forth in claim 11 wherein said step of limiting is carried out by the material forming the surfaces of the apparatus in contact with the water.

13. The method as set forth in claim 12 including the step of applying an amount of power to the first electrode and to each electrode of the pair of electrodes and for a time period commensurate with the size of the aquatic animals and the level of electroanesthesia sought.

14. Apparatus for electroanesthetizing aquatic animals sufficient to at least produce narcosis with an underwater electric field having prescribed dimensions, said apparatus comprising in combination:
   a) a source for providing electric power;
   b) a housing of essentially non electrically conducting material having at least opposed side walls and a bottom for receiving water and the aquatic animals and for limiting the electric field to dimensions defined by any water adjacent the side walls and bottom;
   c) a first electrode disposed within said housing and at least partially immersible within the water in said housing, said first electrode being electrically connected to said source; and
   d) a pair of second electrodes disposed within said housing to bracket said first electrode and being at least partially immersible within the water in said housing, said pair of second electrodes being grounded and electrically connected to said source for further limiting the electric field to the water disposed in said housing between said first electrode and one electrode of said pair of second electrodes and the other electrode of said pair of second electrodes.

15. The apparatus as set forth in claim 14 including power adjustment means for setting the intensity of the electric field to a value sufficient to achieve a predetermined degree of electroanesthesia sought.

16. The apparatus as set forth in claim 14 wherein said first electrode includes a plurality of rods.

17. The apparatus as set forth in claim 14 wherein each electrode of said pair of second electrodes includes a plurality of rods.

18. The apparatus as set forth in claim 17 wherein said first electrode includes a plurality of rods.

19. Apparatus for electroanesthetizing fish, said apparatus comprising in combination:
   a) an electrically insulated waterway;
   b) a first electrode disposed within said waterway;
   c) a pair of second electrodes disposed within said waterway on opposed sides of said first electrode;
   d) a source of electric power;
   e) means for applying electric power to said first electrode and each electrode of said pair of second electrodes to establish an electric field only between said first electrode and each electrode of said pair of second electrodes within any water in said waterway to electroanesthetize any fish entering the electric field in the water in the waterway; and
   f) means for grounding said pair of second electrodes to limit the electric field to the water in said waterway between said first electrode and each electrode of said pair of second electrodes.

20. Apparatus for electroanesthetizing fish, said apparatus comprising in combination:
   a) a channel for containing water and the fish;
   b) a first electrode disposed generally centrally within said channel;
   c) a pair of second electrodes disposed within said channel on opposed sides of said first electrode and proximate opposed ends of said channel;
   d) means for grounding said pair of second electrodes; and
   e) a source of electric power for applying electric power to said first and second electrodes to establish an electric field between said pair of second electrodes within any water in said channel to electroanesthetize any fish in the electric field in the water in said channel.

21. The apparatus as set forth in claim 20 including an inlet and an outlet for accommodating water flow through said channel.

22. A modular structure for accommodating water flow therethrough and for electroanesthetizing fish within the water in said structure, said modular structure comprising in combination:
   a) a box for accommodating flow of water therethrough;
   b) a first electrode at a first voltage potential and associated with said box;
   c) a pair of equipotential second electrodes at a second voltage potential different from said first voltage potential and associated with said box and bracketing said first electrode;
   d) a source of power for establishing an electric field between said first electrode and each electrode of said pair of second electrodes and within any water in said box disposed between said pair of second electrodes, which electric field defines a segment of said box to induce at least narcosis in any fish entering the defined segment of said box; and
   e) means for limiting the electric field to be within the defined segment of said box.

23. The modular structure as set forth in claim 22 wherein said limiting means comprises a ground return between said source of power and said pair of second electrodes.

24. A method for electroanesthetizing fish within water in a channel, which channel includes a first electrode and a pair of second electrodes bracketing the first electrode, said method comprising the steps of:

a) establishing an electric field between the first electrode and each electrode of the pair of second electrodes in any water contained with the channel, which channel includes material of low electrical conductivity extending at least between the electrodes of the pair of second electrodes;

b) containing the electric field within the channel between the pair of second electrodes bracketing the first electrode by grounding each electrode of the pair of second electrodes; and c) inducing at least narcosis in any fish entering the electric field within the channel.

25. The method as set forth in claim 24 wherein said step of establishing includes the step of applying alternating current between the first electrode and each electrode of the pair of second electrodes to establish the electric field.

* * * * *